(12) United States Patent
Rutar

(10) Patent No.: US 12,071,942 B2
(45) Date of Patent: Aug. 27, 2024

(54) VARIABLE DISPLACEMENT PUMPS

(71) Applicant: Hamilton Sundstrand Corporation, Charlotte, NC (US)

(72) Inventor: Matej Rutar, Manchester, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 224 days.

(21) Appl. No.: 17/508,600

(22) Filed: Oct. 22, 2021

(65) Prior Publication Data
US 2023/0125840 A1    Apr. 27, 2023

(51) Int. Cl.
| | |
|---|---|
| *F04B 49/00* | (2006.01) |
| *F02C 9/26* | (2006.01) |
| *F02C 9/30* | (2006.01) |
| *F02C 9/38* | (2006.01) |
| *F04B 1/295* | (2020.01) |
| *F04B 1/324* | (2020.01) |
| *F04B 49/06* | (2006.01) |
| *F04B 49/08* | (2006.01) |
| *F04B 49/24* | (2006.01) |
| *F02C 7/232* | (2006.01) |
| *F02K 1/17* | (2006.01) |

(52) U.S. Cl.
CPC ............ *F04B 49/002* (2013.01); *F04B 1/295* (2013.01); *F04B 1/324* (2013.01); *F04B 49/065* (2013.01); *F04B 49/08* (2013.01); *F04B 49/24* (2013.01); *F02C 7/232* (2013.01); *F02C 9/263* (2013.01); *F02C 9/30* (2013.01); *F02C 9/38* (2013.01); *F02K 1/17* (2013.01); *F04B 49/246* (2013.01); *F04B 2205/05* (2013.01)

(58) Field of Classification Search
CPC .......... F04B 1/295; F04B 1/324; F04B 49/08; F04B 49/24; F04B 49/002; F04B 49/065; F02K 1/17; F02C 7/232; F02C 9/263; F02C 9/30; F02C 9/38
See application file for complete search history.

(56) References Cited

U.S. PATENT DOCUMENTS 2,945,449 A  *  7/1960  Lefebvre .................. F04B 49/08
                                                       91/506
5,586,869 A     12/1996  Benckert et al.
(Continued)

FOREIGN PATENT DOCUMENTS

| CN | 111673954 A | 9/2020 | |
|---|---|---|---|
| FR | 2946165 A1 * | 12/2010 | ............ G05B 15/02 |
| WO | 2019183160 A1 | 9/2019 | |

OTHER PUBLICATIONS

Extended European Search Report dated Feb. 7, 2023, issued during the prosecution of European Patent Application No. EP22196331.7.

*Primary Examiner* — Charles G Freay
(74) *Attorney, Agent, or Firm* — Kinney & Lange, P.A.

(57) ABSTRACT

In accordance with at least one aspect of this disclosure, a variable displacement pump system can include, a variable displacement pump disposed in a main line and configured to supply pressure to receive a low pressure fluid and to output a high pressure fluid. The main line can connect a hydraulic fluid source to a plurality of system actuators, where the variable displacement pump is disposed in the main line between the hydraulic fluid source and the plurality of system actuators to pressurize the hydraulic fluid.

14 Claims, 1 Drawing Sheet

(56) References Cited

U.S. PATENT DOCUMENTS

| | | |
|---|---|---|
| 2010/0232999 A1 | 9/2010 | Okoroafor |
| 2011/0147523 A1 | 6/2011 | West et al. |
| 2016/0116059 A1 | 4/2016 | Holtmann et al. |
| 2016/0363117 A1* | 12/2016 | Ligenfelter ............ F04B 49/065 |
| 2017/0130881 A1 | 5/2017 | Edwards et al. |
| 2018/0340501 A1* | 11/2018 | Ni ........................... F04B 49/08 |

* cited by examiner

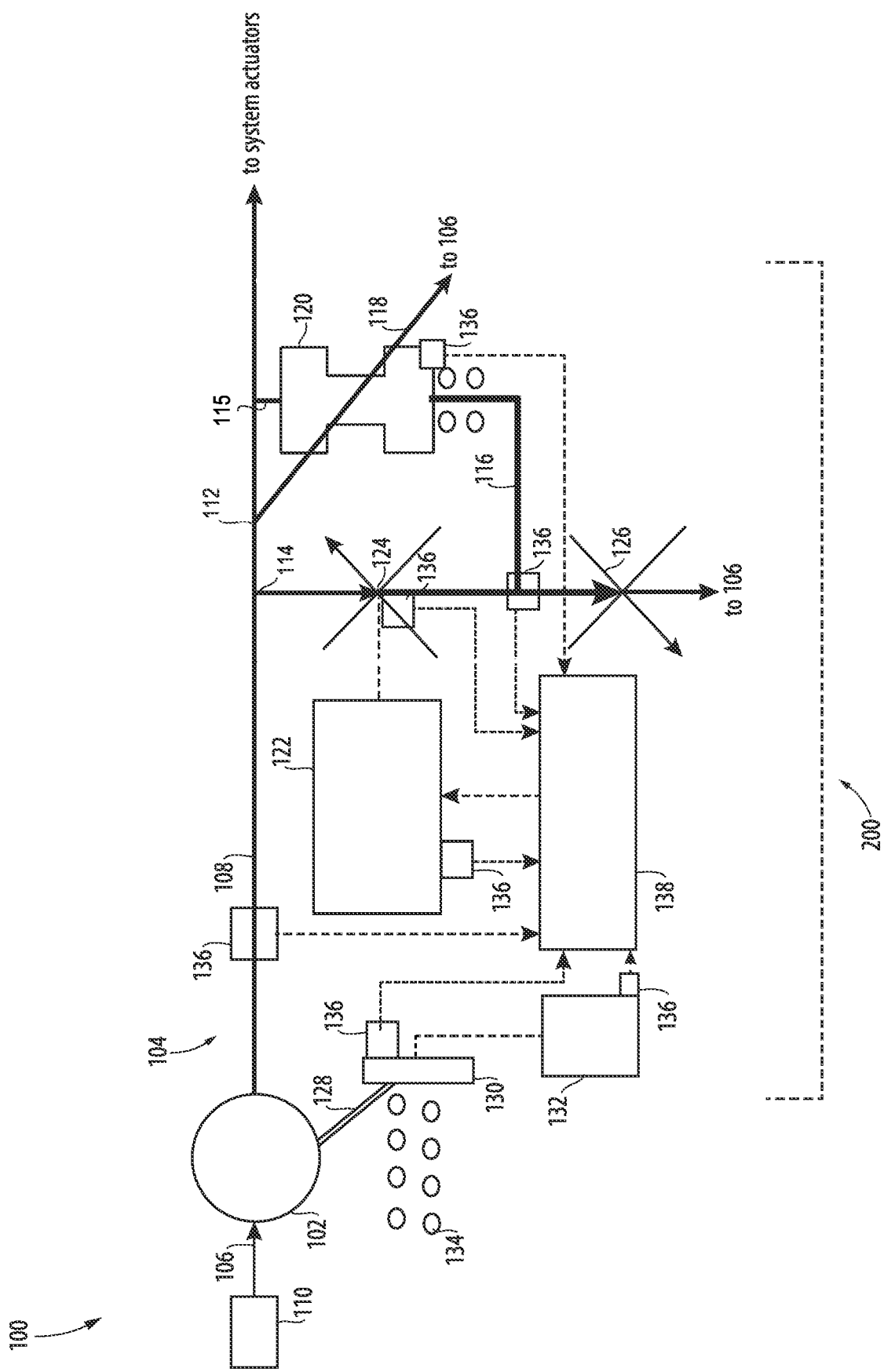

VARIABLE DISPLACEMENT PUMPS

STATEMENT OF GOVERNMENT RIGHTS

This invention was made with government support under government contract. The government has certain rights in the invention.

TECHNICAL FIELD

The present disclosure relates to variable displacement pumps, and more particularly to methods for controlling variable displacement pumps.

BACKGROUND

Fixed displacement pumps can typically be sized to meet peak demand at a few operating conditions meaning the pump is then oversized for the remainder of conditions. Variable displacement pumps can be used to provide greater efficiency, as the flow can be changed for each operating condition. However, the pump displacement must be controlled to ensure system responsiveness and stability standards are met.

There is always a need in the art for improvements to methods for controlling variable displacement pumps in the aerospace industry. This disclosure provides a solution for this need.

SUMMARY

In accordance with at least one aspect of this disclosure, a variable displacement pump system includes, a variable displacement pump disposed in a main line and configured to receive a low pressure fluid and to output a high pressure fluid. A pressure port can be disposed in the main line downstream of the variable displacement pump configured to port a portion of the high pressure fluid from the main line to a bypass line. A pressure regulating valve can be disposed in the bypass line configured to bypass a portion of the high pressure fluid from the main line to control a pressure of the main line based on an adjustable regulating set point of the pressure regulating valve.

A first controllable valve can be operatively connected to a metering mechanism disposed in a secondary branch of the main line upstream of the pressure regulating valve configured to modulate a pressure of the secondary branch to control the adjustable regulating set point of the pressure regulating valve. A mechanical linkage can be operatively connected to the variable displacement pump configured to be driven by a pressure actuated piston to control displacement of the variable displacement pump. A second controllable valve can be operatively connected to the pressure actuated piston configured to supply a pressure to adjust the position of the piston.

In embodiments, one or more sensors can be operatively connected to sense at least one of a position of the pressure regulating valve and/or a pressure of the main line and configured to output a respective signal indicative of the position of the pressure regulating valve and/or the pressure of the main line. A controller can be operatively connected to receive at least one of the signal indicative of the position of the pressure regulating valve and/or the pressure of the main line In embodiments, the controller can include machine readable instructions configured to cause the controller to control at least one of the first and/or second controllable valves to achieve an adjustable regulating set point position of the pressure regulating valve, and adjust a position of the pressure actuated piston to drive the mechanical linkage, varying displacement of the variable displacement pump based on at least one of the signal indicative of the position of the pressure regulating valve and/or a pressure of the main line.

In embodiments, the controller can include machine readable instructions configured to cause the controller to control an output pressure set point of the variable displacement pump based on the adjustable regulating set point of the pressure regulating valve. In embodiments, the controller can include machine readable instructions configured to cause the controller to control the at least one of the first and/or second controllable valves to achieve the adjustable regulating set point of the pressure regulating valve in real time to adjust displacement of the variable displacement pump based on the adjustable pressure set point of the pressure regulating valve without stopping flow through the variable displacement pump.

In certain embodiments, the metering mechanism can include a variable metering orifice and the system can further include a fixed metering orifice. In certain such embodiments, the controller can include machine readable instructions configured to cause the controller to control the first controllable valve to align the variable metering orifice in series with the fixed metering orifice to modulate the pressure in the secondary branch to adjust the regulating set point of the pressure regulating valve. In embodiments, the fixed metering orifice is disposed in the secondary branch downstream of the variable metering orifice and configured to bleed a portion of the fluid in the secondary branch back to the main line.

In certain embodiments, the system can include a biasing member operatively connected to the pressure actuated piston and configured to supply an opposing force on the piston to drive the mechanical linkage to adjust displacement of the variable displacement pump. In certain embodiments, the at least one of the first and/or second controllable valves can include an electrohydraulic servo valve. In certain embodiments, the at least one of the first and/or second controllable valves can include a proportional solenoid valve. In certain embodiments, the position sensor can include a linear variable differential transformer. In embodiments, the main line can be configured to supply hydraulic fluid from a hydraulic fluid source to a plurality of actuators.

In accordance with at least one aspect of this disclosure, a control system for a variable displacement pump can include one or more sensors configured to sense one or more of a pressure of a main line, a position of a mechanical linkage operatively connected to the variable displacement pump disposed in the main line, and/or a position of a pressure regulating valve disposed in a bypass line downstream of the variable displacement pump.

A controller can be operatively connected and configured to receive one or more respective signals indicative of the pressure of the main line, the position of the mechanical linkage operatively connected to the variable displacement pump, and/or the pressure regulating valve. In embodiments, the controller can include machine readable instructions configured to cause the controller to perform any one or more of the functions described herein. For example, in embodiments, the machine readable instructions can be configured to, at least, cause the controller control one or more operatively connected controllable valves to control at least one of displacement of the variable displacement pump and/or an adjustable regulating set point of the pressure regulating valve based at least in part on the respective indicative signals.

In accordance with at least one aspect of this disclosure, a method for controlling a variable displacement pump can include, porting a portion of a high pressure fluid from a main line to a bypass line, porting a portion of the high pressure fluid from the main line to a secondary modulating pressure line, metering the high pressure fluid in the secondary modulating pressure line with a one or more metering mechanisms to control a regulating set point of a pressure regulating valve in the bypass line, sensing a position of the pressure regulating valve, and adjusting a position of a mechanical linkage operatively connected to the variable displacement pump to control displacement of the variable displacement pump based at least in part on a signal indicative of the position of the pressure regulating valve.

In certain embodiments, the one or more metering mechanisms can include a variable metering orifice and a fixed metering orifice disposed in the secondary modulating pressure line. In certain such embodiments, the method can include controlling a first controllable valve to align the variable metering orifice in series with the fixed metering orifice to modulate the pressure in the secondary modulating pressure line of to adjust the regulating set point of the pressure regulating valve.

In embodiments, the method can include bleeding a portion of the high pressure fluid in the one or more of the bypass line and/or the secondary modulating pressure line, and returning the portion of the high pressure fluid to the main line.

In certain embodiments, adjusting the position of the mechanical linkage can include controlling the one or more metering mechanisms to achieve the adjustable regulating set point of the pressure regulating valve in real time to adjust displacement of the variable displacement pump based on the adjustable pressure set point of the pressure regulating valve without stopping flow through the variable displacement pump. In certain embodiments, the one or more metering mechanisms can include at least one of: a fixed metering orifice; a variable metering orifice, an electrohydraulic servo valve; and/or a proportional solenoid valve.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain FIGURES, wherein:

FIG. 1 is schematic view of a variable displacement pump system in accordance with this disclosure, showing a control scheme for controlling an output pressure of the variable displacement pump.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100.

Fixed displacement pumps may be oversized to meet needs at certain operating conditions but then produce excess output during other operation. Variable displacement pumps can improve efficiency but require a control scheme. Traditional pressure compensated variable displacement pumps operate under at a single pressure set point or used a manual pressure adjustment mechanism. Embodiments described herein allow for the ability to adjust the output pressure set point for given system actuation needs.

In accordance with at least one aspect of this disclosure, a variable displacement pump system 100 can include, a variable displacement pump 102 disposed in a main line 104 and configured to receive a low pressure fluid from an inlet portion 106 of the main line 104 and to output a high pressure fluid to an outlet portion 108 of the main line 104. The main line 104 can connect a hydraulic fluid source 110 to a plurality of system actuators, where the variable displacement pump 102 is disposed in the main line 104 between the hydraulic fluid source 110 and the plurality of system actuators to pressurize the hydraulic fluid.

A pressure port 112 can be disposed in the main line 104 downstream of the variable displacement pump 102 configured to port a portion (e.g., certain excess flow) of the high pressure fluid from the outlet portion 108 of the main line 104 to a bypass line 118. The flow through bypass line 118 can be controlled by a pressure regulating valve 120. During normal operation, bypass through bypass line 118 should be little to none, if the variable displacement pump is operating at a given output pressure set point for the desired system actuators. A second pressure port 114 can be disposed in the outlet portion 108 of the main line 104 configured to port a portion of the high pressure fluid to a secondary modulated pressure branch 116.

The pressure regulating valve 120 can regulate the pressure between a port 115 on line 108 and the modulated pressure branch 116. For example, a relative increase in pressure at port 115 would force the pressure regulating valve 120 to move axially towards an open position, allowing more bypass flow from the main line 104 to bypass through bypass line 118 back to the inlet portion 106 of the main line 106. In this scenario, the system pressure in line 108 to the actuators would decrease. Conversely, an increase in flow through port 114 would increase the pressure in the modulated pressure branch 116, forcing the pressure regulating valve 120 to move axially towards a closed position, allowing less bypass through bypass line 118. Here, the system pressure in line 108 to the system actuators would increase. The pressure regulating valve can include an adjustable regulating set point, which can determine the amount of flow through the bypass line 118, and in turn, the pressure in outlet pressure to the system actuators in line 108.

The modulated pressure in branch 116 can be set by the first controllable valve 122 (e.g., any suitable valve including an electrohydraulic servo valve and/or a proportional solenoid, for example) by changing a variable flow area 124 to allow flow from the outlet portion 108 of the main line to flow to the secondary branch 116. An orifice 126 can be disposed in 116 downstream of the variable metering orifice 124 to control the adjustable regulating set point of the pressure regulating valve 120. In embodiments, using a hydro-mechanical pressure regulating valve (e.g., such as valve 120) can respond quicker to counter system disturbances than by controlling pump displacement alone. The variable metering orifice 124 can be configured to receive flow from the main line 104 (e.g., directly via port 114), and the fixed metering orifice 126 can be configured to bleed a portion of the modulated pressure 116 back to the inlet portion 106 of the main line 104.

A mechanical linkage 128 can be mechanically, operatively connected to the variable displacement pump 102 to be driven by a pressure actuated piston 130. Movement of the piston 130 drives the mechanical linkage 128 to any desired position to control the displacement of the variable displacement pump 102. A second controllable valve 132 (e.g., any suitable valve, including electrohydraulic servo valve, for example) can be operatively connected to the pressure actuated piston 130 to supply a pressure to adjust the position of the piston 130 to drive the mechanical linkage 128. A biasing member 134 (e.g., a resilient member or a spring) can be operatively connected to the pressure actuated piston 130 to counteract the force from the piston 130.

One or more sensors 136 can be operatively connected to sense a plurality of inputs in the system 100, including, but not limited to, a position of the pressure regulating valve 120 and/or a pressure of the main line 104. It may also be possible to sense a position or state of either one of the first and/or second controllable valves 122, 132, the variable metering orifice 124, and/or a modulated pressure in branch 116. The one or more sensors 136 can be configured to output a respective signal indicative of the sensed inputs, for example at least a signal indicative of the position of the pressure regulating valve and/or the pressure of the main line (e.g., as indicated by the dashed lines). The one or more sensors 136 can include any suitable sensors, such as pressure sensors, position sensors (e.g., including a linear variable differential transformer), temperature sensors, and the like.

A controller 138 can be operatively connected to receive the respective sensed inputs, including at least the signal indicative of the position of the pressure regulating valve 120 and/or the pressure of the main line 104. The controller 138 can include machine readable instructions configured to cause the controller 138 to control at least one of the first and/or second controllable valves 122 to achieve the adjustable regulating set point position of the pressure regulating valve 120, or 132 to adjust a position of the pressure actuated piston 130 to drive the mechanical linkage 128, varying displacement of the variable displacement pump 102 based on at least one of the signal indicative of the position of the pressure regulating valve 120 and/or a pressure of the main line 104.

In certain embodiments, controlling the displacement of the variable displacement pump 102 can be based on a desired position of adjustable regulating set point the pressure regulating valve 120. In certain embodiments, the machine readable instructions can be configured to cause the controller 138 to control the first controllable valve 122 to adjust the variable metering orifice 124 in series with the fixed metering orifice 126 to control the modulated pressure 116 to adjust the regulating set point of the pressure regulating valve 120.

In certain embodiments, the machine readable instructions can be configured to cause the controller 138 to control the at least one of the first and/or second controllable valves 122, 132 to achieve the adjustable regulating set point of the pressure regulating valve 120 in real time to adjust the output pressure set point of the variable displacement pump 102 to the system actuators and to control displacement of the variable displacement pump 102 without stopping flow through the variable displacement pump 102.

In accordance with at least one aspect of this disclosure, a control system 200 for a variable displacement pump (e.g., pump 102) can include one or more sensors (e.g., sensors 136) operatively connected to sense one or more of a pressure of a main line (e.g., main line 104), a position of a mechanical linkage (e.g. linkage 128) operatively connected to the variable displacement pump disposed in the main line, and/or a position of a pressure regulating valve (e.g., valve 120) disposed in a bypass line (e.g., bypass line 118) downstream of the variable displacement pump. A controller (e.g., controller 138) can be operatively connected to receive one or more respective signals can be configured to control one or more controllable valves (e.g., valves 122, 132) to control at least one of displacement of the variable displacement pump and/or a regulating set point of the pressure regulating valve based at least in part on the respective indicative signals. In embodiments, the controller can be configured to adjust the adjustable regulating set point of the pressure regulating valve in real time and to control displacement of the variable displacement pump based on the desired flow without stopping flow through the variable displacement pump (e.g., via controlling controllable valves 122, 132).

In embodiments, the controller 138 and/or control system 200 can be or include both hard wired circuits that cause a logic (e.g., predictive) to be executed, and/or software-based components, for example, simple electric circuits employing analogue components, or the controller can include a CPU, a memory, machine readable instructions in the memory that when executed cause the CPU to perform a method or cause the control system to perform a method, for example as described below. In embodiments, the controller can utilize any suitable algorithm to control the controllable valve as provided herein. In embodiments, the algorithm could be constructed using the functionality as described above in addition to known general engineering principles as applied to the specific characteristics of each particular fuel system to which the technology of the present disclosure is applied.

In accordance with at least one aspect of this disclosure, a method for controlling a variable displacement pump (e.g., pump 102) can include porting a portion (e.g., an excess) of a high pressure fluid from a main line (e.g. main line 104) to a bypass line (e.g., bypass line 118), metering the high pressure fluid in the bypass line with a one or more metering mechanisms (e.g., any one or all of controllable valves 122, 132 and/or metering orifices 124, 126) to control a regulating set point of a pressure regulating valve (e.g., valve 120) in the bypass line. The method can include sensing (e.g., using a sensor 136) a position of the pressure regulating valve, and adjusting a position of a mechanical linkage (e.g., linkage 128) operatively connected to the variable displacement pump to control the displacement of variable displacement pump 102.

In embodiments, the method can include controlling a first controllable valve (e.g., valve 122) to align the variable metering orifice in series with the fixed metering orifice to adjust the regulating set point of the pressure regulating valve. In certain embodiments, the method can include bleeding a portion of the high pressure fluid in the modulated pressure branch 116 and returning the portion high pressure fluid to the main line. In embodiments, adjusting the position of the mechanical linkage can include controlling the one or more metering mechanisms to achieve the adjustable regulating set point of the pressure regulating valve in real time to adjust the predetermined pressure set point of the variable displacement pump system and to control the position of the pressure regulating valve without stopping flow through the variable displacement pump.

Embodiments can utilize a pressure regulating valve to maintain an operating pressure of a main line by bypassing excess flow (e.g., through the pressure regulating valve). The pressure on one side of the pressure regulating valve can be modulated to change an operating set point of the pressure regulating valve. A position feedback sensor can be included on the pressure regulating valve (e.g., to sense a position). In embodiments, the flow output of the variable displacement pump can be altered to set a certain, desired position for the pressure regulating valve, and therefore control the excess bypass flow in the system.

Embodiments can combine a fast response to system disturbances using a pressure regulating valve with the efficiency of a variable displacement pump. Adjustability of the system output pressure therefore can be made possible through modulation on one side of the pressure regulating valve alone. For example, a pressure regulating valve can quickly change bypass flow to handle changes in system flow need. The ability to change pump displacement based on the position of the pressure regulating valve can provide for efficient operation by changing the position of the pressure regulating valve to a low or no bypass position.

Embodiments can include a hydro-mechanical pressure regulating valve used to bypass flow to control system pressure. A set point of the pressure regulating valve can be adjustable through a modulated pressure, for example. The displacement of the variable displacement pump can be actively controlled to set a certain pressure regulating valve position. In embodiments, prior to an anticipated system disturbance, the pump displacement can be increased to better allow the pressure regulating valve to counteract the disturbance, for example. In certain other instances, when low system disturbance is expected, for example, the pump displacement can be reduced so that the pressure regulating valve bypasses little to no flow for better pumping efficiency.

In embodiments, the displacement and/or output pressure of the variable displacement pump can be determined by controlling one controllable valve, and the pressure of the system (e.g., the pressure in the main line output portion) can be determined by controlling the position of the pressure regulating valve (e.g., a hydro mechanical valve) by bypassing excess flow back to the inlet portion of the main line. The position sensor on the pressure regulating valve allows for adjusting the pump displacement to a point where the pressure regulating valve is nearly closed so as to bypass little to no flow. Measuring the position of the pressure regulating valve relates to the amount of flow that is bypassed through the pressure regulating valve. In controlling the first and second controllable valves, the displacement of the variable displacement pump can be adjusted to achieve a desired amount of bypass flow (e.g., increase or decrease bypass flow).

For example, in certain instances, the system actuators may require high displacement or high pressure from the main line (e.g., for a large actuator), the displacement of the pump can be increased with its controllable valve, supplying more pressure on the front side of the pressure regulating valve to drive the pressure regulating valve open, allowing more bypass flow. The same or similar can be true in reverse when less flow and/or pressure may be needed for the system actuators, or for smaller actuators, for example. Controlling the controllable valves can then modulate the pressure in the modulated pressure branch to drive the pressure regulating valve towards the closed position, and decreasing the output pressure and flow of the variable displacement valve to decrease the amount of bypass flow.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A variable displacement pump system, comprising:
   a variable displacement pump disposed in a main line and configured to receive a low
   pressure fluid and to output a high pressure fluid;
   a pressure port disposed in the main line downstream of the variable displacement pump configured to port a portion of the high pressure fluid from the main line to a bypass line;
   a pressure regulating valve disposed in the bypass line configured to bypass the portion of the high pressure fluid from the main line to control a pressure of the main line based on an adjustable regulating set point of the pressure regulating valve;
   a first controllable valve operatively connected to a metering mechanism disposed in a secondary branch of the main line upstream of the pressure port configured to modulate a pressure of the secondary branch to control the adjustable regulating set point of the pressure regulating valve;
   a mechanical linkage operatively connected to the variable displacement pump configured to
   be driven by a pressure actuated piston to control displacement of the variable displacement pump;
   a second controllable valve operatively connected to the pressure actuated piston configured to supply a fluid pressure to adjust the position of the piston;
   one or more sensors operatively connected to sense at least one of a position of the pressure regulating valve and/or a pressure of the main line and configured to output a respective signal indicative of the position of the pressure regulating valve and/or the pressure of the main line; and
   a controller operatively connected to receive at least one of the signal indicative of the position of the pressure regulating valve and/or the pressure of the main line, wherein the controller includes machine readable instructions configured to cause the controller to:

control at least one of the first and/or second controllable valves to achieve the adjustable regulating set point of the pressure regulating valve; and adjust a position of the pressure actuated piston to drive the mechanical linkage, varying displacement of the variable displacement pump based on at least one of the signal indicative of the position of the pressure regulating valve and/or the pressure of the main line.

2. The system as recited in claim 1, wherein the controller includes machine readable instructions configured to cause the controller to:

control an output pressure set point of the variable displacement pump based on the adjustable regulating set point of the pressure regulating valve.

3. The system as recited in claim 2, wherein the controller includes machine readable instructions configured to cause the controller to:

control the at least one of the first and/or second controllable valves to achieve the adjustable regulating set point of the pressure regulating valve in real time to adjust displacement of the variable displacement pump based on the adjustable pressure set point of the pressure regulating valve without stopping flow through the variable displacement pump.

4. The system as recited in claim 1, where in the metering mechanism includes a variable metering orifice in series with a fixed metering orifice, wherein the controller includes machine readable instructions configured to cause the controller to:

modulate the pressure in the secondary branch and thereby adjust the regulating set point of the pressure regulating valve by controlling the first controllable valve to adjust the variable metering orifice.

5. The system as recited in claim 4, wherein the fixed metering orifice is disposed in the secondary branch downstream of the variable metering orifice and configured to bleed a portion of the fluid in the secondary branch back to the main line.

6. The system as recited in claim 1, further comprising a biasing member operatively connected to the pressure actuated piston and configured to supply an opposing force on the piston to drive the mechanical linkage to adjust displacement of the variable displacement pump.

7. The system as recited in claim 1, wherein the at least one of the first and/or second controllable valves includes an electrohydraulic servo valve.

8. The system as recited in claim 1, wherein the at least one of the first and/or second controllable valves includes a proportional solenoid valve.

9. The system as recited in claim 1, wherein the position sensor includes a linear variable differential transformer.

10. The system as recited in claim 1, wherein the main line is configured to supply hydraulic fluid from a hydraulic fluid source to a plurality of actuators.

11. A control system for a variable displacement pump, comprising:

one or more sensors configured to sense one or more of a pressure of a main line, a position of a mechanical linkage operatively connected to the variable displacement pump disposed in the main line, and/or a position of a pressure regulating valve disposed in a bypass line downstream of the variable displacement pump; and a controller operatively connected to the one or more sensors and configured to receive one or more signals from the one or more sensors indicative of the pressure of the main line, the position of the mechanical linkage operatively connected to the variable displacement pump, and/or the position of the pressure regulating valve, wherein the controller includes machine readable instructions configured to cause the controller to: control one or more operatively connected controllable valves to control at least one of: displacement of the variable displacement pump and/or an adjustable regulating set point of the pressure regulating valve based at least in part on the respective signals indicative of the pressure of the main line, the position of the mechanical linkage operatively connected to the variable displacement pump, and/or the position of the pressure regulating valve, and control an output pressure set point of the variable displacement pump based on the adjustable regulating set point of the pressure regulating valve.

12. The system as recited in claim 11, wherein the controller includes machine readable instructions configured to cause the controller to:

control at least one of the one or more operatively connected controllable valves to adjust a position of the mechanical linkage varying displacement of the variable displacement pump based on at least one of the signals indicative of the position of the pressure regulating valve and/or the pressure of the main line to achieve the adjustable regulating set point of the pressure regulating valve.

13. The system as recited in claim 11, wherein the controller includes machine readable instructions configured to cause the controller to:

control the at least one of the one or more controllable valves to achieve the adjustable regulating set point of the pressure regulating valve in real time to adjust the displacement of the variable displacement pump based on the adjustable regulating set point of the pressure regulating valve without stopping flow through the variable displacement pump.

14. A control system for a variable displacement pump, comprising:

one or more sensors configured to sense one or more of a pressure of a main line, a position of a mechanical linkage operatively connected to the variable displacement pump, the variable displacement pump being disposed in the main line, and/or a position of a pressure regulating valve disposed in a bypass line downstream of the variable displacement pump; and a controller operatively connected to the one or more sensors and configured to receive one or more signals from the one or more sensors indicative of the pressure of the main line, the position of the mechanical linkage operatively connected to the variable displacement pump, and/or the position of the pressure regulating valve, wherein the controller includes machine readable instructions configured to cause the controller to: control one or more operatively connected controllable valves to control at least one of: displacement of the variable displacement pump and/or an adjustable regulating set point of the pressure regulating valve based at least in part on the respective signals indicative of the pressure of the main line, the position of the mechanical linkage operatively connected to the variable displacement pump, and/or the position of the pressure regulating valve;

a variable metering orifice in a secondary branch of the main line and operatively connected to the one or more operatively connected controllable valves; and a fixed metering orifice in the secondary branch downstream from the variable metering orifice and in series with the variable metering orifice, and wherein the controller includes machine readable instructions configured to cause the controller to:

modulate the pressure in the secondary branch and thereby adjust the adjustable regulating set point of the pressure regulating valve by controlling the one or more operatively connected controllable valves to adjust the variable metering orifice.

* * * * *